United States Patent [19]
Alligood et al.

[11] Patent Number: 5,748,988
[45] Date of Patent: May 5, 1998

[54] QUIETLY OPERATING ANTI-BACKUP PAWL FOR MANUAL FILM ADVANCE THUMBWHEEL IN CAMERA

[75] Inventors: John H. Alligood, Penfield; Mark A. Lamphron, Rochester; David Cipolla, Pittsford, all of N.Y.

[73] Assignee: Eastman Kodak Company, Rochester, N.Y.

[21] Appl. No.: 816,282

[22] Filed: Mar. 13, 1997

[51] Int. Cl.$^6$ .............................. G03B 17/02; G03B 1/00
[52] U.S. Cl. ............................ 396/6; 396/395; 396/411
[58] Field of Search .................. 396/6, 360, 361, 396/395, 396, 411, 511, 512, 513, 514, 515, 516

[56] References Cited

U.S. PATENT DOCUMENTS

| | | | |
|---|---|---|---|
| 2,652,209 | 9/1953 | Hodges | 396/396 |
| 3,414,209 | 12/1968 | Kimura | 396/395 |
| 5,510,866 | 4/1996 | Solomon et al. | 396/395 |
| 5,614,975 | 3/1997 | SanGregory et al. | 396/396 |

FOREIGN PATENT DOCUMENTS

| | | |
|---|---|---|
| 7-5549 | 7/1995 | Japan . |
| 8-106120 | 8/1996 | Japan . |

*Primary Examiner*—Eddie C. Lee
*Attorney, Agent, or Firm*—Roger A. Fields

[57] ABSTRACT

A camera comprising a rear cover part having a rear opening, a rotatable film advance thumbwheel protruding from the rear opening to permit the thumbwheel to be manually rotated in a film winding direction and having a continuous alternating series of teeth and spaces, and a flexible beam projecting from the rear cover part and having an anti-backup pawl to be received in anyone of the spaces to prevent reverse rotation of the thumbwheel but being pushed out of anyone of the spaces to make the beam flex away from the thumbwheel when the thumbwheel is rotated in the film winding direction, is characterized in that the beam has a pair of opposite ends fixed to the rear cover part and said pawl is located between the fixed opposite ends, to make the beam be flexed intermediate its fixed opposite ends when the pawl is pushed out of anyone of the spaces because of manual rotation of the thumbwheel in the film winding direction, whereby the natural frequency of vibration of the beam can be raised to make the noise of the pawl contacting successive ones of the teeth when the thumbwheel is rotated in the film winding direction less noticeable.

7 Claims, 4 Drawing Sheets

QUIETLY OPERATING ANTI-BACKUP PAWL FOR MANUAL FILM ADVANCE THUMBWHEEL IN CAMERA

FIELD OF THE INVENTION

The invention relates generally to the field of photography, and in particular to cameras. More specifically, the invention relates to a quietly operating anti-backup pawl for a manually rotatable film advance thumbwheel in a camera.

BACKGROUND OF THE INVENTION

Film and cameras that are all in one, commonly referred to as single-use or one-time-use cameras, have become well known. Typically, the one-time-use camera is a simple point-and-shoot type comprising a plastic main body part which supports a fixed-focus taking lens, a film metering mechanism with a rotatably supported metering sprocket, a manually rotatable film advance thumbwheel, a single-blade shutter, a manually depressible shutter release button, a frame counter for indicating the number of exposures remaining for picture-taking, a direct see-through viewfinder, a film cartridge, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially contains the camera unit and may have respective openings for the taking lens, the shutter release button, the film advance thumbwheel, the viewfinder, the frame counter, and a flash emission window for the electronic flash.

At the manufacturer, the main body part is loaded with the film cartridge and the front and rear cover parts are connected to the main body part and/or to the front cover part to complete the camera unit. Then, an exposed end of a take-up spool in the main body part is rotated to factory prewind substantially the entire length of an unexposed filmstrip from the film cartridge onto the take-up spool. Lastly, the outer box is placed on the camera unit.

During picture-taking, after the photographer takes a picture, he or she manually rotates the thumbwheel in a film winding direction to rotate a film spool inside the film cartridge, to wind an exposed section of the filmstrip into the film cartridge. The rewinding movement of the filmstrip the equivalent of slightly more than one frame width rotates the metering sprocket to decrement the frame counter to its next lower-numbered setting and to pivot a metering lever into engagement with the thumbwheel to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip are exposed and the filmstrip is completely rewound into the film cartridge, the one-time-use camera is given to a photofinisher who tears the outer box off the camera unit, separates the rear cover part from the main body part, and removes the film cartridge with the filmstrip from the main body part. Then, he removes the filmstrip from the film cartridge to develop the negatives and make prints for the customer, and he forwards the used camera parts to the manufacturer for recycling, i.e. remanufacture.

PROBLEM IN THE PRIOR ART

As shown in FIG. 4 of the accompanying drawings, a known one-time-use camera 10 has an elongate rear opening 12 in the rear cover part 14, from which the thumbwheel 16 radially protrudes to permit the thumbwheel to be manually rotated in the film winding direction 18 (to the right in FIG. 4). The thumbwheel 16 has a continuous alternating series of peripheral symmetrical teeth 20 and interdental spaces 22 that are to be manually grasped or fingered to rotate the thumbwheel in the film winding direction 18. A cantilever beam 24 with one end 26 fixed to, i.e. integral with, the rear cover part has an anti-backup pawl 28 at a free end 30 of the beam. The pawl 28 is received in anyone of the interdental spaces 22 to prevent reverse rotation of the thumbwheel 16, i.e. rotation opposite to the film winding direction 18, and is pushed out of anyone of the interdental spaces to make the beam flex away from the thumbwheel when the thumbwheel is rotated in the film winding direction 18. The natural frequency of vibration of the cantilever beam 24 is well within the range of human hearing, which makes the noise of the anti-backup pawl 28 contacting successive ones of the teeth 20 when the thumbwheel 16 is rotated in the film winding direction 18 possibly objectionable.

SUMMARY OF THE INVENTION

Generally speaking, a camera comprising a rotatable part to be rotated in a predetermined direction and having a continuous alternating series of teeth and spaces, and a flexible beam having an anti-backup pawl to be received in anyone of the spaces to prevent reverse rotation of the rotatable part but being pushed out of anyone of the spaces to make the beam flex away from the rotatable part when the rotatable part is rotated in the predetermined direction, is characterized in that:

the beam has a pair of fixed opposite ends and the pawl is located between the fixed opposite ends, to make the beam be flexed only intermediate its fixed opposite ends when the pawl is pushed out of anyone of the spaces because of rotation of the rotatable part in the predetermined direction, whereby the natural frequency of vibration of the beam can be raised to make the noise of the pawl contacting successive ones of the teeth when the rotatable part is rotated in the predetermined direction less noticeable.

More particularly, a camera comprising a rear cover part having a rear opening, a rotatable film advance thumbwheel protruding from the rear opening to permit the thumbwheel to be manually rotated in a film winding direction and having a continuous alternating series of teeth and spaces, and a flexible beam projecting from the rear cover part and having an anti-backup pawl to be received in anyone of the spaces to prevent reverse rotation of the thumbwheel but being pushed out of anyone of the spaces to make the beam flex away from the thumbwheel when the thumbwheel is rotated in the film winding direction, is characterized in that:

the beam has a pair of opposite ends fixed to the rear cover part and said pawl is located between the fixed opposite ends, to make the beam be flexed intermediate its fixed opposite ends when the pawl is pushed out of anyone of the spaces because of manual rotation of the thumbwheel in the film winding direction, whereby the natural frequency of vibration of the beam can be raised to make the noise of the pawl contacting successive ones of the teeth when the thumbwheel is rotated in the film winding direction less noticeable.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

BACKGROUND

The natural frequency $f_1$ of vibration (cycles per second) of a uniform beam with both ends fixed can be expressed by the equation $$f_1 = \frac{13.86}{2\pi} \sqrt{\frac{EIg}{Wl^3}},$$

where E=modulus of elasticity, I=area moment of inertia, g=gravitational acceleration, and W=center load.

The natural frequency $f_2$ of vibration of a uniform beam with the left end fixed and the right end free (cantilever) can be expressed by the equation $$f_2 = \frac{1.732}{2\pi} \sqrt{\frac{EIg}{Wl^3}},$$

where E=modulus of elasticity, I=area moment of inertia, g=gravitational acceleration, and W=right end load.

A comparison of the two equations indicates that the natural frequency $f_1$ of vibration of a uniform beam with both ends fixed is eight times (8×) the natural frequency $f_2$ of vibration of a uniform beam with one end fixed and the other end free (cantilever). The 8× higher frequency $f_1$ of vibration of a uniform beam with both ends fixed makes that type beam a preferred choice when it is desired that the noise generated during vibration of the beam be less audible to the human ear (as compared to the noise generated during vibration of a beam with one end fixed and the other end free). The 8× factor is obtained by dividing 13.86/1.732 (which=8.00).

PREFERRED EMBODIMENT

Figure 1:
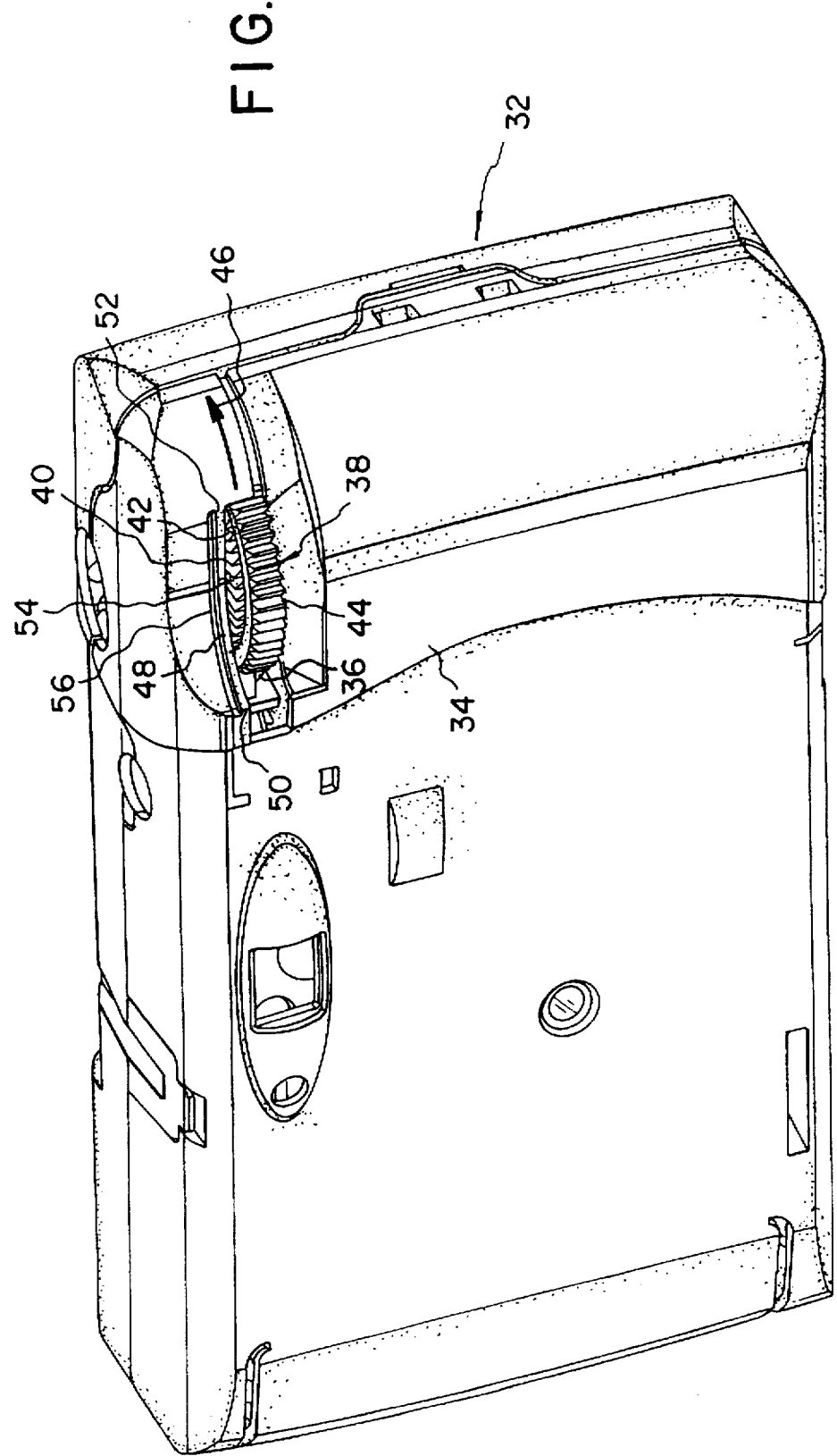
FIG. 1 is a rear perspective view of a one-time-use camera including an anti-backup pawl for a manually rotatable film advance thumbwheel in the camera, according to a preferred embodiment of the invention.
Figure 2:
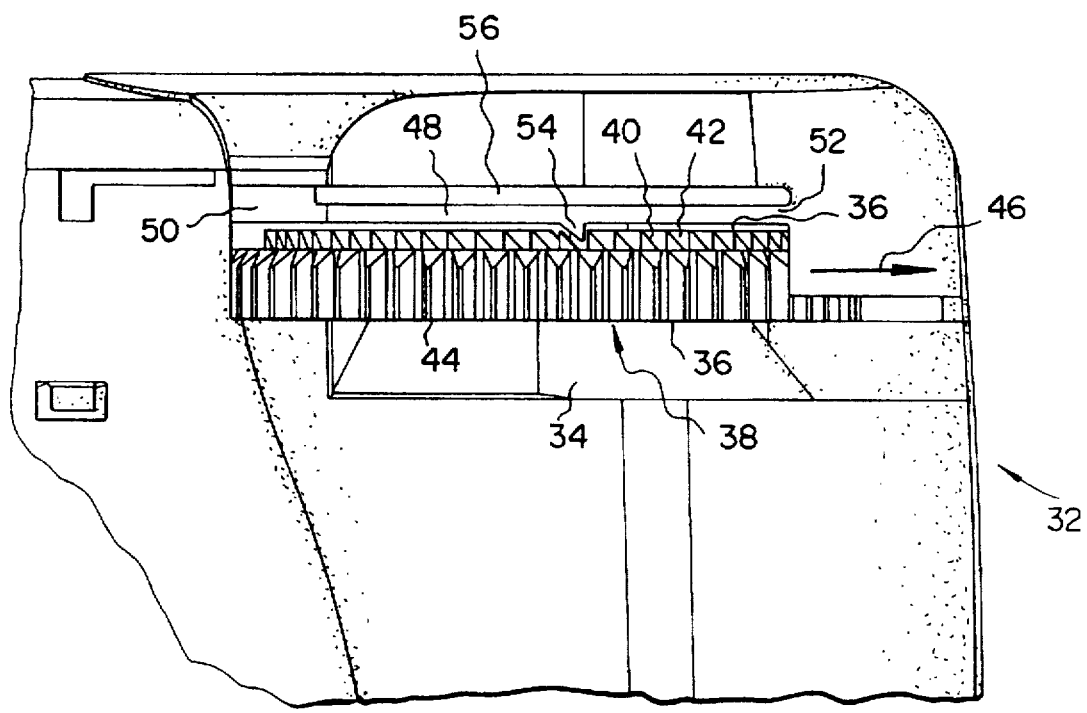
FIG. 2 is a rear elevation view of the camera shown in FIG. 1.

Referring now to the drawings, FIGS. 1 and 2 show a one-time-use camera 32 with a plastic rear cover part 34 having an elongate rear opening 36. A rotatable film advance thumbwheel 38 peripherally protrudes from the rear opening 36 to expose a continuous alternating top series of asymmetrical inclined teeth 40 and interdental spaces 42 and a continuous alternating peripheral series of manually engageable symmetrical teeth 44. The engageable teeth 44 are intended to be manually grasped or fingered to rotate the thumbwheel in a film winding direction 46 (to the right in FIGS. 1 and 2). A flexible resilient beam 48 has a pair of opposite ends 50 and 52 fixed to, i.e. integral with, the rear cover part 34 and an anti-backup pawl 54 midway between the opposite ends of the beam. The pawl 54 projects laterally from the beam 48 into anyone of the interdental spaces 42 to prevent reverse rotation of the beam, i.e. rotation opposite to the film winding direction 46. As shown in FIG. 2, the beam 48 extends from its fixed opposite ends 50 and 52 to between the rear opening 36 (including the thumbwheel 38) and a parallel deflection slot 56 in the rear cover part 34.

When the thumbwheel 38 is manually rotated in the film winding direction 46 (to the right in FIGS. 1 and 2), the inclined teeth 40 in succession push against the pawl 54 to drive the pawl out of respective ones of the interdental spaces 42 to in turn flex (bow) the beam 48 laterally into the deflection slot 56. The inherent resiliency of the beam 48 causes the beam to immediately reverse flex (straighten out) to drive the pawl 54 into the next available one of the interdental spaces 42.

Since the beam 48 has its opposite ends 50 and 52 fixed, the natural frequency $f_1$ of vibration of the beam is 8× the natural frequency $f_2$ of vibration of a beam with one end fixed and the other end free (cantilever). As a result, the noise of the pawl 54 contacting or hitting successive ones of the inclined teeth 40 when the pawl enters the next available one of the interdental spaces 42 is less noticeable.

ALTERNATE EMBODIMENT

Figure 3:
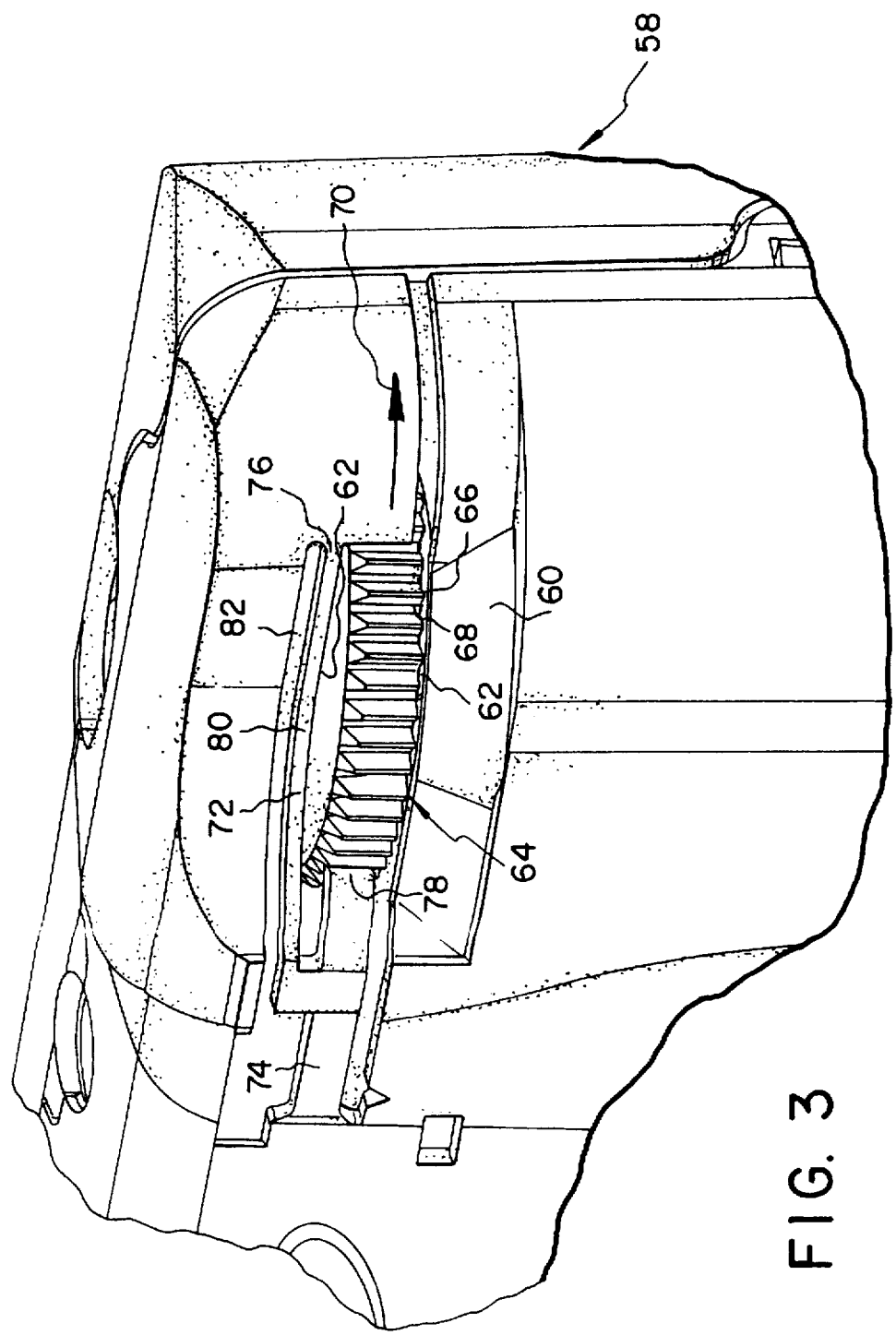
FIG. 3 is a rear perspective view of a one-time-use camera including an anti-backup pawl for a manually rotatable film advance thumbwheel in the camera, according to an alternate embodiment of the invention.
Figure 4:
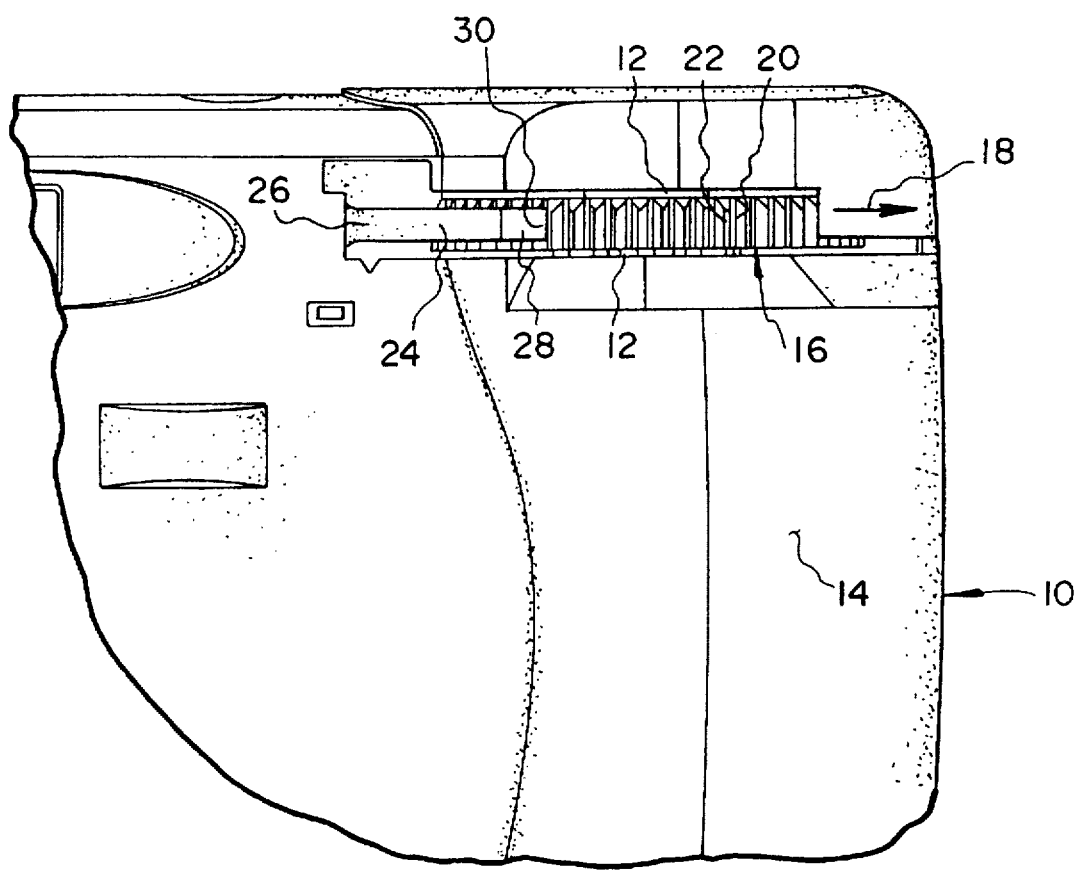
FIG. 4 is a rear elevation view of a prior art camera including an anti-backup pawl for a manually rotatable film advance thumbwheel in the camera.

FIG. 3 shows a one-time-use camera 58 with a plastic rear cover part 60 having an elongate rear opening 62. A rotatable film advance thumbwheel 64 peripherally protrudes from the rear opening 62 to expose a continuous alternating peripheral series of asymmetrical inclined teeth 66 and interdental spaces 68. The inclined teeth 66 are intended to be manually grasped or fingered to rotate the thumbwheel in a film winding direction 70 (to the right in FIG. 3). A flexible resilient beam 72 has a pair of opposite ends 74 and 76 fixed to, i.e. integral with, the rear cover part 60 and an anti-backup pawl 78 between the opposite ends of the beam. The pawl 78 projects from the beam 72, parallel to a major portion 80 of the beam, into anyone of the interdental spaces 68 to prevent reverse rotation of the beam, i.e. rotation opposite to the film winding direction 70. As shown in FIG. 3, the major portion 80 of the beam 72 extends from the fixed opposite end 76 of the beam to between the rear opening 62 (including the thumbwheel 64) and a parallel deflection slot 82 in the rear cover part 60.

When the thumbwheel 64 is manually rotated in the film winding direction 70 (to the right in FIG. 3), the inclined teeth 66 in succession push against the pawl 78 to drive the pawl out of respective ones of the interdental spaces 68 to in turn flex (bow) the beam 72 laterally between the rear opening 62 (including the thumbwheel) and the deflection slot 82. The inherent resiliency of the beam 72 causes the beam to immediately reverse flex (straighten out) to drive the pawl 78 into the next available one of the interdental spaces 68.

Since the beam 72 has its opposite ends 74 and 76 fixed, the natural frequency $f_1$ of vibration of the beam is 8× the natural frequency $f_2$ of vibration of a beam with one end fixed and the other end free (cantilever). As a result, the noise of the pawl 78 contacting or hitting successive ones of the inclined teeth 66 when the pawl enters the next available one of the interdental spaces 68 is less noticeable.

The invention has been described with reference to a preferred embodiment. However, it will be appreciated that variations and modifications can be effected by a person of ordinary skill in the art without departing from the scope of the invention.

PARTS LIST
10. one-time-use camera
12. rear opening
14. rear cover part
16. thumbwheel
18. film winding direction
20. symmetrical teeth
22. interdental spaces
24. cantilever beam
26. fixed end
28. anti-backup pawl
30. free end
32. one-time-use camera
34. rear cover part
36. rear opening
38. thumbwheel
40. inclined teeth
42. interdental spaces
44. symmetrical teeth
46. film winding direction
48. beam
50. fixed opposite end
52. fixed opposite end
54. anti back-up pawl
56. deflection slot
58. one-time-use camera
60. rear cover part
62. rear opening
64. thumbwheel
66. inclined teeth
68. interdental spaces
70. film winding direction
72. beam
74. fixed opposite end
76. fixed opposite end
78. anti back-up pawl
80. major portion
82. deflection slot

What is claimed is:

1. A camera comprising a rotatable part to be rotated in a predetermined direction and having a continuous alternating series of teeth and spaces, and a flexible beam having an anti-backup pawl to be received in anyone of said spaces to prevent reverse rotation of said rotatable part but being pushed out of anyone of the spaces to make said beam flex away from said rotatable part when the rotatable part is rotated in the predetermined direction, is characterized in that:

said beam has a pair of opposite ends fixed to be continuously held in place and said pawl is located between said fixed opposite ends, to make said beam be flexed only intermediate the fixed opposite ends when said pawl is pushed out of anyone of said spaces because of rotation of said rotatable part in the predetermined direction, whereby the natural frequency of vibration of said beam can be raised to make the noise of said pawl contacting successive ones of said teeth when said rotatable part is rotated in the predetermined direction less noticeable.

2. A camera comprising a rear cover part having a rear opening, a rotatable film advance thumbwheel protruding from said rear opening to permit said thumbwheel to be manually rotated in a film winding direction and having a continuous alternating series of teeth and spaces, and a flexible beam projecting from said rear cover part and having an anti-backup pawl to be received in anyone of said spaces to prevent reverse rotation of said thumbwheel but being pushed out of anyone of the spaces to make said beam flex away from said thumbwheel when the thumbwheel is rotated in the film winding direction, is characterized in that:

said beam has a pair of opposite ends fixed to said rear cover part and said pawl is located between said fixed opposite ends, to make said beam be flexed intermediate the fixed opposite ends when said pawl is pushed out of anyone of said spaces because of manual rotation of said thumbwheel in the film winding direction, whereby the natural frequency of vibration of said beam can be raised to make the noise of said pawl contacting successive ones of said teeth when said thumbwheel is rotated in the film winding direction less noticeable.

3. A camera as recited in claim 2, wherein said teeth are asymmetrical.

4. A camera as recited in claim 2, wherein said rear cover part has a deflection slot separate from said rear opening for receiving said beam intermediate said fixed opposite ends when the beam is flexed due to said pawl being pushed out of anyone of said spaces.

5. A camera as recited in claim 4, wherein said beam extends from said fixed opposite ends parallel between said deflection slot and said rear opening.

6. A camera as recited in claim 3, wherein said thumbwheel has peripherally engageable teeth separate from said series of teeth and spaces which can be manually grasped to rotate the thumbwheel in the film winding direction.

7. A camera as recited in claim 2, wherein said rear cover part has a deflection slot parallel to said rear opening, and said beam extends parallel to and between said deflection slot and said rear opening to allow the beam to be flexed intermediate said fixed opposite ends when the beam is flexed due to said pawl being pushed out of anyone of said spaces.

* * * * *